US010376089B2

(12) United States Patent
Deuber et al.

(10) Patent No.: US 10,376,089 B2
(45) Date of Patent: Aug. 13, 2019

(54) SYSTEM FOR PREPARING A BREWED PRODUCT

(71) Applicant: Qbo Coffee GmbH, Wallisellen (CH)

(72) Inventors: Louis Deuber, Richterswil (CH); Rüdiger Ternité, Hamburg (DE)

(73) Assignee: QBO COFFEE GMBH, Wallisellen (CH)

( * ) Notice: Subject to any disclaimer, the term of this patent is extended or adjusted under 35 U.S.C. 154(b) by 218 days.

(21) Appl. No.: 15/116,279

(22) PCT Filed: Jan. 29, 2015

(86) PCT No.: PCT/EP2015/051836
§ 371 (c)(1),
(2) Date: Aug. 3, 2016

(87) PCT Pub. No.: WO2015/117890
PCT Pub. Date: Aug. 13, 2015

(65) Prior Publication Data
US 2016/0345768 A1    Dec. 1, 2016

(30) Foreign Application Priority Data

Feb. 6, 2014 (EP) .................................. 14154110

(51) Int. Cl.
*A47J 31/36* (2006.01)
*A47J 31/06* (2006.01)
*A23F 5/26* (2006.01)

(52) U.S. Cl.
CPC ............. *A47J 31/3628* (2013.01); *A23F 5/26* (2013.01); *A47J 31/0673* (2013.01); *A47J 31/3695* (2013.01)

(58) Field of Classification Search
CPC . A47J 31/3628; A47J 31/3695; A47J 31/0673
(Continued)

(56) References Cited

U.S. PATENT DOCUMENTS 3,607,297 A * 9/1971 Fasano ................ A47J 31/3661
426/431
7,946,217 B2 * 5/2011 Favre .................. A47J 31/0668
99/295
(Continued)

FOREIGN PATENT DOCUMENTS

CN       1618382       5/2005
CN      101048094     10/2007
(Continued)

OTHER PUBLICATIONS

English translation of Chinese Office Action dated Jul. 23, 2018, Application No. 201580006251.3, 15 pages.

*Primary Examiner* — Reginald Alexander
(74) *Attorney, Agent, or Firm* — Rankin, Hill & Clark LLP

(57) ABSTRACT

A system for preparing a brewed product, the system including a portion capsule containing an extraction material, and an extraction appliance for preparing the brewed product from the extraction material contained in the portion capsule. The extraction appliance has an injection device for introducing a brewing liquid into the portion capsule and an extraction device for driving an extraction product out of the portion capsule. The injection device and the extraction device define between them an accommodation space for the portion capsule. The extraction device has a pressure device, by which a wall of the portion capsule inserted in the accommodation space, which wall faces toward the extraction device, can be pressed in toward the capsule interior in order to compact the extraction material contained in the portion capsule before the injection device introduces brewing liquid into the portion capsule.

16 Claims, 3 Drawing Sheets

(58) Field of Classification Search
USPC .................................................. 99/295, 323
See application file for complete search history.

(56) References Cited

U.S. PATENT DOCUMENTS

| | | | | |
|---|---|---|---|---|
| 2006/0196364 A1* | 9/2006 | Kirschner | ........... | A47J 31/3623 |
| | | | | 99/295 |
| 2009/0130270 A1* | 5/2009 | Cortese | ............... | A47J 31/0647 |
| | | | | 426/281 |
| 2010/0269705 A1* | 10/2010 | Zonelli | ............... | A47J 31/0673 |
| | | | | 99/295 |
| 2015/0150407 A1* | 6/2015 | Bugnano | ............. | A47J 31/3638 |
| | | | | 426/431 |

FOREIGN PATENT DOCUMENTS

| | | | | |
|---|---|---|---|---|
| CN | 102405179 | | 4/2012 | |
| EP | 2 196 407 | | 6/2010 | |
| EP | 2 452 894 | | 5/2012 | |
| EP | 2850980 | A1 * | 3/2015 | .......... A47J 31/0673 |
| JP | 2010-515556 | | 5/2010 | |
| JP | 2012-523861 | | 10/2012 | |
| WO | 2009/013777 | | 1/2009 | |
| WO | 2010/149496 | | 12/2010 | |
| WO | 2 647 317 | | 10/2013 | |

* cited by examiner (b)

(a)

(a)

(b)

(c)

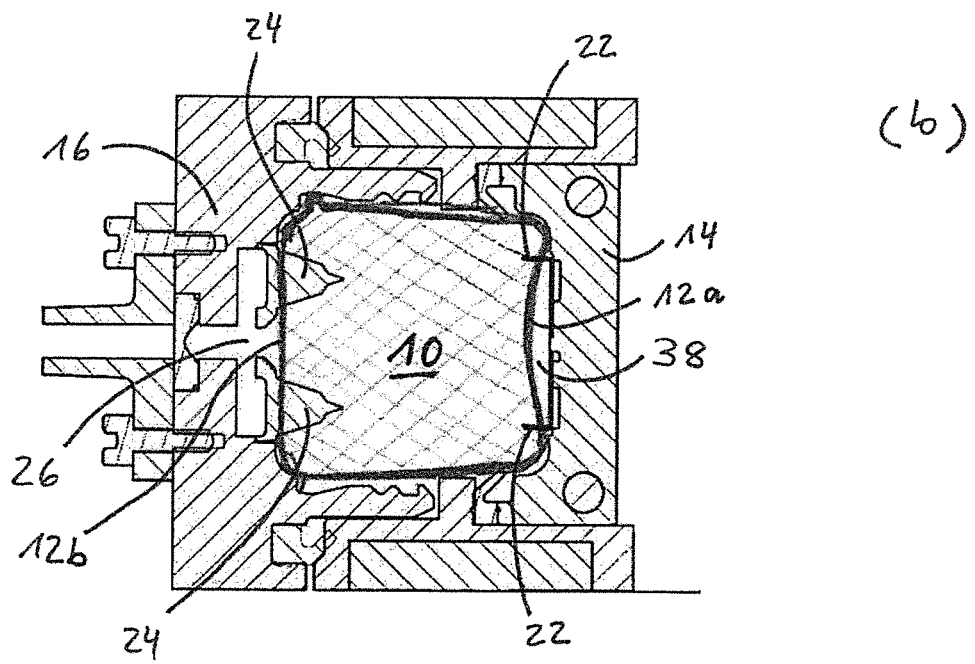
Fig. 3
(b)
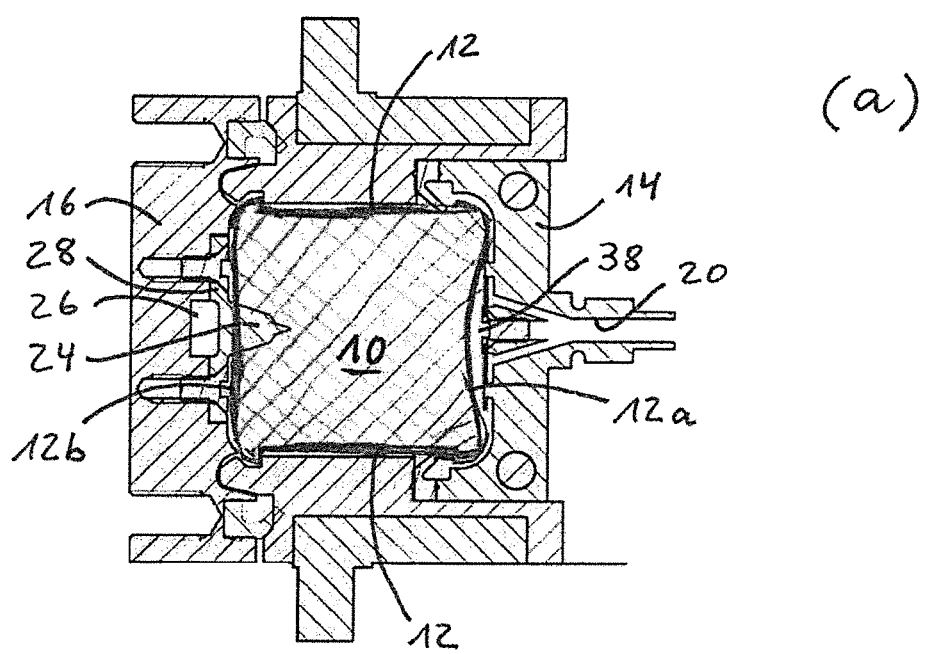
(a)

SYSTEM FOR PREPARING A BREWED PRODUCT

BACKGROUND OF THE INVENTION

Field of the Invention

The invention relates to a system for preparing a brewed product with a portion capsule containing an extraction material and with an extraction appliance for preparing the brewed product from the extraction material contained in the portion capsule, wherein the extraction appliance includes an injection device for introducing a brewing fluid into the portion capsule, and an extraction device for discharging an extraction product out of the portion capsule, wherein the injection device and the extraction device between them define a receiving space for the portion capsule and can be moved apart in a relative manner for inserting the capsule into the receiving space and can be moved to one another in a relative manner for fixing the capsule.

Description of Related Art

Such a system is basically known, for example from EP 2 647 317 A1, and in particular is used for preparing coffee.

It is the object of the invention, to provide a system that permits the preparation of an improved brewed product and in particular leads to a coffee of a higher quality in the cup.

According to the invention, an extraction device includes a pressing means, by way of which a wall of the portion capsule inserted into the receiving space, the wall facing the extraction device can be pressed in the direction of the capsule interior for compacting the extraction material contained in the portion capsule, before the injection device introduces brewing fluid into the portion capsule.

The invention is based on the general concept of compressing the portion capsule and compacting the extraction material contained therein, before carrying out the actual brewing procedure. A second compression of the portion capsule can additionally be effected during the brewing procedure when the portion capsule at the injection side is subjected to brewing fluid under pressure. The compacting of the extraction material before the brewing procedure, which is generally called tamping with portafilter machines for coffee preparation, as is known, results in a significantly improved quality of the brewed product. The compacted ground coffee offers a uniformly high resistance to the water over the complete capsule volume, so that all regions of the capsule are uniformly subjected to throughflow, and the flow rate of the water reduces, while the pressure increases, which is in contrast to a non-compressed coffee. On the one hand, an improved extraction of the aromas is obtained by way of this, and on the other hand an improved "crema", as is particularly desirable with espresso-like coffee drinks, on account of the higher pressure. With a horizontal brewing process, with which a portion capsule is not subjected to throughflow from the top to the bottom, but in the horizontal direction, the compression of the capsule and of the extraction material lying therein in accordance with the invention, also serves for compensating irregularities in the distribution of the extraction material in the capsule that are caused by gravity. In particular, one avoids a lower flow resistance arising in the capsule at the top due to the extraction material collecting in the capsule at the bottom. This effect is a known problem with the portion capsule that is used in the system according to the invention, since this includes an arched cover, in which no extraction material is located, which is to say the capsule is not completely filled, but has an empty space. The compacting of the extraction material can be accomplished independently of the injection of the brewing fluid into the portion capsule, which is to say the compacting of the extraction material on the one hand, and the injection of the brewing fluid on the other hand, can be optimised separately from one another, due to the fact that the compression of the portion capsule according to the invention is effected from the extraction side, by way of which finally the best possible quality of the brewed product can be achieved.

According to an embodiment, the pressing means is a passive component that presses in the wall of the portion capsule when the injection device and the extraction device are moved to one another for fixing the capsule. The pressing means does not therefore need to be activated separately, but it acts automatically, which is to say on its own accord, when the portion capsule is fixed in the receiving space.

The pressing means advantageously includes at least one extraction spike of the extraction device. The extraction spike in this case fulfils a dual function, on the one hand by way of it compressing the portion capsule and compacting the extraction material that is contained therein and on the other hand by way of it ensuring a discharge of the extraction product out of the portion capsule. This dual or double function of the extraction spike contributes to a simpler and more economical constructional form of the extraction device. Of course, it is likewise conceivable to combine extraction spikes or other piercing elements with separate pressing means, such as e.g. a punch-like element, into one component, without the extraction spike itself forming the pressing means. The extraction spikes or piercing elements can then each have any shape.

The extraction spike, for example, can have a pyramid-like or cone-like basic shape and include a lateral surface that extends from a base element to a tip of the extraction spike that faces the injection device.

The extraction spike preferably includes a widening, in particular a shoulder, in the region of its tip. The widening in particular contributes to the extraction spike not only simply piecing the wall of the portion capsule that faces the extraction device and smoothly penetrating the portion capsule, but rather with the widening being supported on the wall of the portion capsule, in order to displace this inwards by a desired amount, i.e. thus for pressing it in, for compacting the extraction material.

The extraction spike, for example, can include at least one projecting rib that extends from the base element along the lateral surface in the direction of the tip, wherein preferably at least three such ribs are arranged distributed uniformly around the lateral surface. The rib or each rib advantageously ends at a distance to the tip.

The ribs for their part assume a dual function, by way of them not only forming the previously mentioned widening of the extraction spike, which leads to an improved compacting of the extraction material, but moreover also ensuring an improved discharge of the extraction product out of the portion capsule. Specifically, an overpressure builds up in the portion capsule during the brewing procedure due to the injection of brewing fluid into the portion capsule, on account of which overpressure the capsule wall facing the extraction device is displaced in the direction of the extraction device and nestles on the lateral surface of the extraction spike. The ribs of the extraction spike in this situation contribute to small discharge openings in the capsule wall being retained, through which openings the extraction product can be led out of the portion capsules.

A discharge opening is provided in the base element, advantageously in the region of the rib or each rib, for the discharge of the extraction product. A passage opening can also be provided in each case on both sides of the rib or of each rib, for example.

The discharge of the extraction product out of the portion capsule can moreover be further improved if a channel, e.g. in the form of a groove and which runs out into a passage opening and through which the extraction material can flow away in a controlled manner, runs along the or each rib. A channel running out into a passage opening advantageously runs in each case on both sides of the rib or of each rib.

The pressing means preferably has five extraction spikes, in order to optimise the compacting of the extraction material contained in the portion capsule and the discharge of the extraction product during the brewing procedure. Four of these extraction spikes can, for example, be arranged in the corners of a square, while a fifth is placed in the center of the square. A pressing means, which is designed in such a manner, is particularly well suited for pressing in the wall of a cube-shaped or cuboid-shaped portion capsule. A matching portion capsule thus has an essentially cubic or cuboid-shaped basic shape. A pressing means, which is arranged centrally with respect to the capsule, such as, for example, an extraction spike that is placed roughly in the centre or a group of extraction spikes placed in the center, is particularly well suited so as to achieve an efficient pressing-in of the capsule and compacting of the extraction material, independently of the geometry of the capsule.

Thereby, it is advantageous if the arrangement of the extraction spikes is adapted to the size of the portion capsule, in particular in a manner such that the diagonals of the square spanned by the extraction spikes is shorter than a maximal diagonal or a maximal diameter of the wall of the portion capsule that faces the extraction device.

At least the wall of the portion capsule that faces the extraction device is formed from a plastic material, according to a particularly preferred embodiment. The plastic material of the wall facing the extraction device should thereby be of such a nature that although being able to be pierced by the extraction spikes, it however does not thereby tear, but offers enough resistance to the extraction spikes, that the capsule wall facing the extraction device can be pressed in to an adequate extent for compacting the extraction material contained in the portion capsule.

A particularly simple and inexpensive manufacture of the portion capsule can moreover be achieved if all walls of the portion capsule are formed from one and preferably the same plastic material. A suitable plastic material, for example, is polypropylene, e.g. with a wall thickness in the range of 0.1 mm to 0.7 mm.

The plastic material preferably includes a barrier layer that serves as an oxygen barrier and thus ensures an aroma protection for the contents of the capsule. An ethylene vinyl alcohol copolymer (EVOH) is considered as a material for such a barrier layer.

Such a portion capsule can be manufactured, for example, by way of a five-sided polyhedron main body that is open at a sixth side and being formed by deep drawing, the main body being filled with extraction material and the open sixth side being subsequently closed by a cover that, for example, is welded or bonded to the main body. Such a polyhedron main body can alternatively also be manufactured with an injection moulding method.

The cover can either be manufactured with an injection moulding method, or with a deep-drawing method, wherein the deep drawing method then approximates an embossing method on account of the low depth of the cover.

The starting materials and the process parameters are selected such that the desired piercing behaviour mentioned above is achieved, in particular with regard to the wall that faces the extraction device, i.e. with regard to the cover concerning the above-described construction.

BRIEF DESCRIPTION OF THE DRAWINGS

The invention is hereinafter described purely by way of example and by way of a possible embodiment with reference to the attached drawings. There are shown in:

FIG. 3a, b the sections of FIG. 1, after carrying out a brewing procedure.

DETAILED DESCRIPTION OF THE PREFERRED EMBODIMENT

Figure 1:
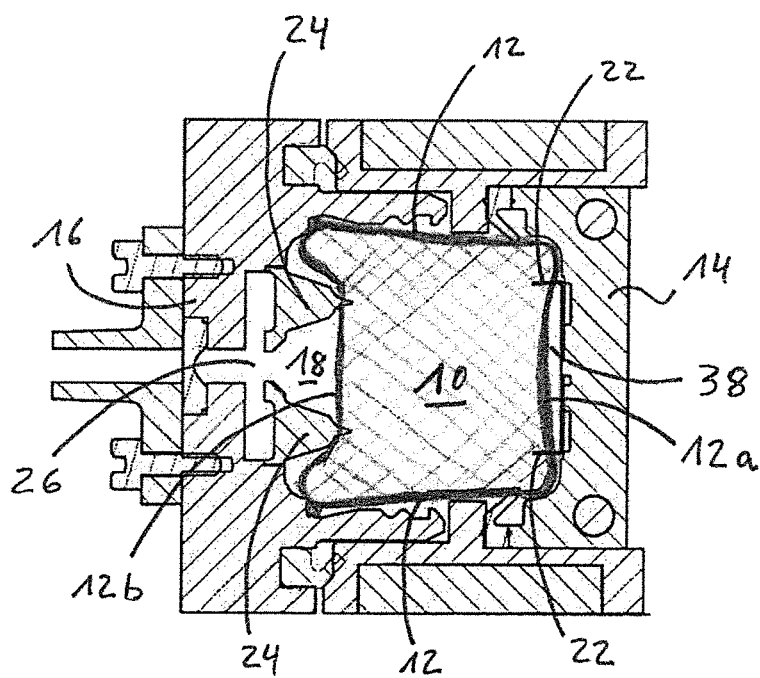
FIG. 1a, b sections through a brewing module of an extraction appliance according to the invention, with a portion capsule which is received therein, before carrying out a brewing process, and specifically (a) in a plane running through the middle point of the portion capsule and (b) in a plane which is parallel to this but which lies further to the outside.
Figure 1:
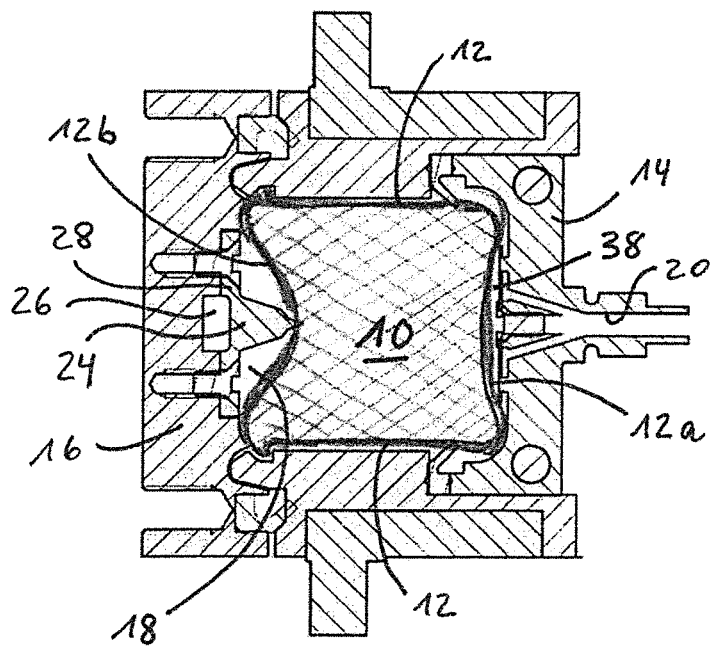

A brewing module of an extraction appliance, in the present embodiment example of a coffee machine, is represented in FIG. 1, wherein a portion capsule 10 including an extraction material, here a coffee powder, is received in the brewing module.

The portion capsule 10 has an at least approximately cubic basic shape and has six capsule walls 12 that are formed of a plastic material, here polypropylene, and in each case have a wall thickness in the range of 0.1 mm to 0.7 mm. The individual capsule walls 12 are at least approximately planar, before insertion of the portion capsule 10 into the brewing module. The capsule walls 12 are easily deformed under pressure due to their low wall thickness and their design from plastic material.

The brewing module has an injection device 14 for introducing hot brewing fluid into the portion capsule 10, as well as an extraction device 16 for the discharge of an extraction product out of the portion capsule 10 during a brewing procedure. The injection device 14 and the extraction device 16 between them form a receiving space 18 for the portion capsule 10. The brewing model can be opened, and the injection device 14 and the extraction device 16 can move apart in a relative manner, for inserting a fresh portion capsule 10 into the receiving space 18 or for removing a consumed portion capsule 10 out of the receiving space 18, wherein it is conceivable for both devices 14, 16 to be movably mounted and actually moved, or only one of the devices 14, 16 to be movably mounted and moved, while the respective other device 16, 15 is installed in a fixed manner and is immovable.

The injection device 14 has a centrally arranged feed channel 20, through which brewing fluid is introduced into the receiving space 18 during a brewing procedure, as well as several injection spikes 22 for piercing a capsule wall 12a of the portion capsule 10 received in the receiving space 18, the capsule wall facing the injection device 14, so that the brewing fluid fed through the injection device 14 during the brewing procedure can penetrate into the portion capsule 10.

Accordingly, the extraction device 16 includes several extraction spikes 24 for piercing a capsule wall 12b of the portion capsule 10 that faces the extraction device 16, so that an extraction product, here coffee, can exit out of the portion capsule 10 and flow away through a discharge channel 26 of the extraction device 16 during the brewing procedure.

Figure 2:
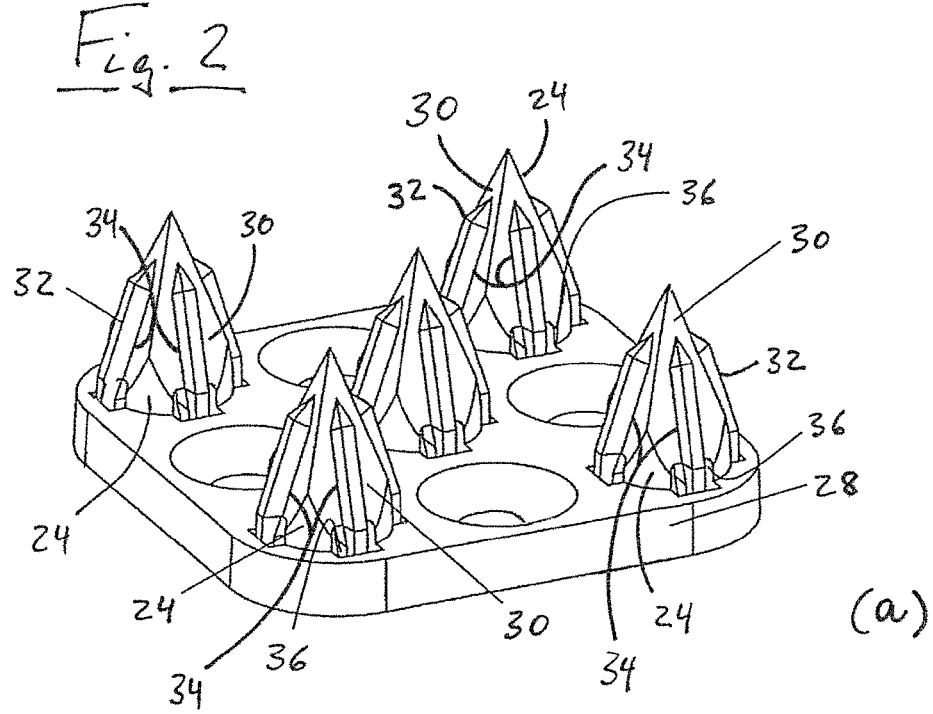
FIG. 2a-c different views of an arrangement of extraction spikes of an extraction device of the brewing module of FIG. 1.
Figure 2:
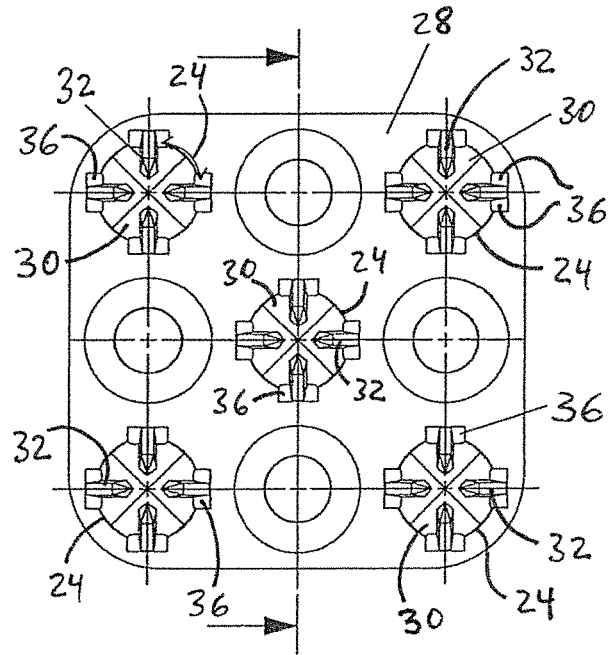
Figure 2:
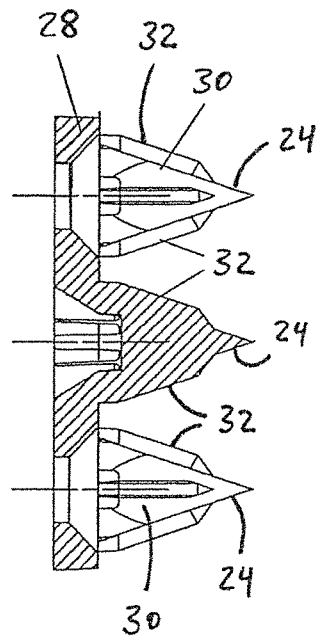

As FIG. 2 shows, the extraction device 16 includes five extraction spikes 24, of which four span a square, in whose center the fifth extraction spike 24 is arranged. The extraction spikes 24 project from a plate-like base element 28 and in each case have a pyramidal basic shape, here in the form of a four-sided pyramid. A projecting rib 32 extends along each pyramid side 30 in the direction of the tip of the extraction spike 24, in a manner departing from the base element 28. Each rib 32 has a rectangular cross section, wherein the end of each rib 32 that is away from the base element 28 tapers in a pointed manner and ends at a distance to the tip of the extraction spike 24. A groove 34, which runs out into a passage opening 36, runs on both sides of each rib 32, wherein the passage opening is provided at the foot of the rib 32 in the base element 28 and is connected to the discharge channel 26 of the extraction device 16.

The injection spikes 22 and the extraction spikes 24 are arranged such that on the injection side and on the extraction side respectively, they pierce into a portion capsule 10 inserted into the receiving space 18, when the brewing module is closed and the injection device 14 and the extraction device 16 are moved to one another. In other words, a minimal distance between the injection spikes 22 and the extraction spikes 24 is smaller than the distance between the capsule walls 12a, 12b of a fresh, non-compressed portion capsule 10, which face the injection device 14 and the extraction device 16 respectively.

Furthermore, the minimal distance between the injection spikes 22 and the extraction spikes 24 is dimensioned such that the capsule wall 12b facing the extraction device 16 is not only pierced, but is additionally pressed in by a certain amount in the direction of the capsule interior, as is to be recognised in FIG. 1. This compression of the portion capsule 10 before carrying out the brewing procedure effects a compacting of the extraction material contained in the portion capsule 10 and leads to a noticeable improvement of the quality of the brewed product, thus e.g. of the coffee, in the cup.

Brewing fluid, e.g. hot water is introduced under pressure through the feed channel 20 into the receiving space 18, for carrying out the brewing procedure, by which means an additional compression of the portion capsule 10 occurs at the injection side.

If the pressure is sufficiently large in the intermediate space 38, which on the one hand is delimited by the injection device 14 and on the other hand by the capsule wall 12a facing the injection device 14, then the brewing fluid penetrates into the portion capsule 10 at the piercing locations created by the injection spikes 22. The pressure in the portion capsule 10 increases due to the penetrating brewing fluid, and the portion capsule 10 expands, until the lateral capsule walls 12 and the capsule wall 12b facing the extraction device 16 bear on the wall surfaces of the brewing module that delimit the receiving space 18.

As is represented in FIG. 3, thereby in particular the capsule wall 12b, which was previously pressed in and faces the extraction device 16, is pressed outwards again, i.e. therefore in the direction of the extraction device 16. Thereby, the extraction spikes 24 penetrate further and further into the portion capsule 10, until the capsule wall 12b bears on the base element 28 of the extraction device 16. The material of the capsule wall 12b, which is displaced by the extraction spikes 24 during this, thereby bears on the pyramid sides 30 of the extraction spikes 24, by which means the piercing openings caused by the extraction spikes 24 are largely sealed off.

It is merely the ribs 32 provided on the pyramid sides 30 that ensure that a certain distance between the capsule wall 12b and the extraction spike 24 remains on both sides of each rib 32. These distances together with the grooves 34 running along the ribs 32 form discharge openings, through which the extraction product can exit out of the portion capsule 10 when the pressure in the portion capsule 10 has increased to a sufficient extent. The extraction product that exits out of the portion capsule 10 flows away through the grooves 34 on the extraction spikes 24 and through the discharge openings 36 of the base element 28 into the discharge channel 26 of the extraction device 16, through which it is led to a cup.

If the brewing module is opened again after completion of the brewing procedure, and the injection device 14 and the extraction device 16 are moved apart in a relative manner, then the injection spikes 22 and the extraction spikes 24 are pulled out of the portion capsule 10, and the portion capsule 10 can fall into a capture container provided therein, so as to free the receiving space 18 for a fresh portion capsule 10.

LIST OF REFERENCE NUMERALS

10 portion capsule
12 capsule wall
14 injection device
16 extraction device
18 receiving space
20 feed channel
22 injection spike
24 extraction spike
26 discharge channel
28 base element
30 pyramid side
32 rib
34 groove
36 through-opening
38 intermediate space

The invention claimed is:

1. A system for preparing a brewed product with a portion capsule comprising an extraction material and with an extraction appliance for preparing the brewed product from the extraction material contained in the portion capsule,
   wherein the extraction appliance comprises an injection device for introducing a brewing fluid into the portion capsule and an extraction device for discharging an extraction product out of the portion capsule,
   wherein the injection device and the extraction device between them define a receiving space for the portion capsule and can be moved apart in a relative manner for inserting the portion capsule into the receiving space and can be moved to one another in a relative manner for fixing the portion capsule,
   wherein the extraction device comprises a pressing means, by way of which a wall of the portion capsule inserted into the receiving space, said wall facing the extraction device, can be pressed in the direction of a capsule interior, for compacting the extraction material contained in the portion capsule, before the injection device introduces brewing fluid into the portion capsule, and wherein the pressing means comprises at least one extraction spike of the extraction device.

2. The system according to claim 1, wherein the pressing means is a passive component that presses in the wall of the portion capsule, when the injection device and the extraction device are moved to one another for fixing the portion capsule.

3. The system according to claim 1, wherein the extraction spike is pyramid shaped or cone shaped and comprises a lateral surface that extends from a base element to a tip of the extraction spike that faces the injection device.

4. The system according to claim 1, wherein the extraction spike comprises a shoulder in a region of its tip.

5. The system according to claim 3, wherein the extraction spike comprises at least one projecting rib that extends from the base element along the lateral surface in the direction of the tip, and if at least three such ribs are included, the ribs are arranged in a uniformly distributed manner around the lateral surface.

6. The system according to claim 5, wherein the rib or each rib ends at a distance to the tip.

7. The system according to claim 5, wherein a passage opening is provided in the base element, in the region of the rib or each rib.

8. The system according to claim 5, wherein a channel that runs out into a passage opening runs along the rib.

9. The system according to claim 1, wherein the pressing means comprises five extraction spikes, of which four are arranged in the corners of a square, and a fifth one is arranged in the center of the square.

10. The system according to claim 9, wherein the diagonals of the square, which is spanned by the extraction spikes are shorter than a maximal diagonal or a maximal diameter of the wall of the portion capsule, which faces the extraction device.

11. The system according to claim 1, wherein the portion capsule has an essentially cubic or cuboid basic shape.

12. The system according to claim 1, wherein at least the wall of the portion capsule that faces the extraction device is formed from a plastic material.

13. The system according to claim 7, wherein a passage opening is provided on each side of the rib.

14. The system according to claim 8, wherein a channel runs on each side of the rib.

15. The system according to claim 12, wherein all walls of the portion capsule are formed from the plastic material.

16. An extraction appliance for preparing a brewed product from an extraction material contained in a portion capsule, comprising an injection device for introducing a brewing fluid into the portion capsule, and an extraction device for discharging an extraction product out of the portion capsule,
wherein the injection device and the extraction device between them define a receiving space for the portion capsule and can be moved apart in a relative manner for inserting the portion capsule into the receiving space and can be moved to one another in a relative manner for fixing the portion capsule,
wherein the extraction device comprises a pressing means, by way of which a wall of the portion capsule inserted into the receiving space, said wall facing the extraction device, can be pressed in a direction of the capsule interior, for compacting the extraction material contained in the portion capsule, before the injection device introduces brewing fluid into the portion capsule,
wherein the pressing means comprises at least one extraction spike of the extraction device.

* * * * *